United States Patent
Carnevale et al.

(10) Patent No.: US 10,199,673 B2
(45) Date of Patent: Feb. 5, 2019

(54) FUEL CELL STACK HAVING AN END PLATE ASSEMBLY WITH A TAPERED SPRING PLATE

(71) Applicant: AUDI AG, Ingolstadt (DE)

(72) Inventors: Christopher J. Carnevale, South Windsor, CT (US); Jeffrey G. Lake, Vernon, CT (US)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/126,571

(22) PCT Filed: Mar. 21, 2014

(86) PCT No.: PCT/US2014/031417
§ 371 (c)(1),
(2) Date: Sep. 15, 2016

(87) PCT Pub. No.: WO2015/142349
PCT Pub. Date: Sep. 24, 2015

(65) Prior Publication Data
US 2017/0098852 A1    Apr. 6, 2017

(51) Int. Cl.
*H01M 8/248* (2016.01)
*H01M 8/2475* (2016.01)
*H01M 8/0202* (2016.01)

(52) U.S. Cl.
CPC ......... *H01M 8/248* (2013.01); *H01M 8/0202* (2013.01); *H01M 8/2475* (2013.01)

(58) Field of Classification Search
None
See application file for complete search history.

(56) References Cited

U.S. PATENT DOCUMENTS

| | | | |
|---|---|---|---|
| 6,040,072 A | 3/2000 | Murphy et al. |
| 6,428,921 B1 | 8/2002 | Grot |
| 6,764,786 B2 | 7/2004 | Morrow et al. |
| 6,824,901 B2 | 11/2004 | Reiser et al. |
| 8,354,197 B2 | 1/2013 | Lake et al. |
| 2010/0167156 A1 | 7/2010 | Lake et al. |

FOREIGN PATENT DOCUMENTS

| | | |
|---|---|---|
| JP | 2006-260871 A | 9/2006 |
| JP | 2007-294289 A | 11/2007 |

*Primary Examiner* — Wyatt P McConnell
(74) *Attorney, Agent, or Firm* — Seed IP Law Group LLP (57) ABSTRACT

An end plate assembly (38) includes a current collector (40), an electrically non-conductive pressure plate (42), and a tapered spring plate (72). The tapered spring plate (72) includes a thick mid-section (96) and tapered, thin tie rod extensions (74, 76) that extend from the mid-section (96) over deflection cavities (50, 52) in the pressure plate (42). Tie rod nut assemblies (90, 94) apply a load follow-up through the tie-rod extensions (74, 76) to permit limited expansion and contraction of the fuel cells (32). A mid-section of (96) of the spring plate (72) overlies a substantial portion of an upper surface (46) of the pressure plate (42). Because the mid-section (96) is large and thick and because the tie-rod extensions (74,76) are tapered and thin, the entire end plate assembly (38) may be efficiently thin and apply an even load follow-up to the fuel cell stack (30).

8 Claims, 5 Drawing Sheets

FUEL CELL STACK HAVING AN END PLATE ASSEMBLY WITH A TAPERED SPRING PLATE

STATEMENT REGARDING FEDERALLY SPONSORED RESEARCH OR DEVELOPMENT

This disclosure was made with Government support under Contract Number CA-04-7003-00 awarded by The United States Department of Transportation, "FTA Bus Program". The Government has certain rights in this disclosure.

TECHNICAL FIELD

The present disclosure relates to fuel cells that are suited for usage in transportation vehicles, portable power plants, or as stationary power plants, and the disclosure especially relates to a fuel cell stack having an end plate assembly with a tapered spring plate overlying a pressure plate.

BACKGROUND ART

Fuel cells are well-known and are commonly used to produce electrical energy from reducing and oxidizing reactant fluids to power electrical apparatus, such as apparatus on-board space vehicles, transportation vehicles, or as on-site generators for buildings. A plurality of planar fuel cells are typically arranged into a cell stack surrounded by an electrically insulating frame structure that defines manifolds for directing flow of reducing, oxidant, coolant and product fluids as part of a fuel cell power plant. Each individual fuel cell generally includes an anode electrode and a cathode electrode separated by an electrolyte. A fuel cell may also include a water transport plate, or a separator plate, as is well known.

The fuel cell stack produces electricity from reducing fluid and process oxidant streams. As shown in the simplified schematic drawing of a prior art fuel cell stack in FIG. 1, the prior art fuel cell stack 10 includes a reaction portion 12 formed from a plurality of fuel cells 14 stacked adjacent each other that produce electricity in a well-known manner. The plurality of fuel cells 14 includes a first end cell 16 and opposed second end cell 18 at opposed ends of the reaction portion 12 of the fuel cell stack 10. First and second pressure plates 20, 22 overlie the end cells 16, 18 and the pressure plates 20, 22 are secured to each other typically by a plurality of tie rod nut assemblies (not shown) to apply a compressive load to the stack to seal a plurality of compression seals (not shown) within the stack 10. Most known pressure plates 20, 22 are made of large, conductive metal materials.

Figure 1:
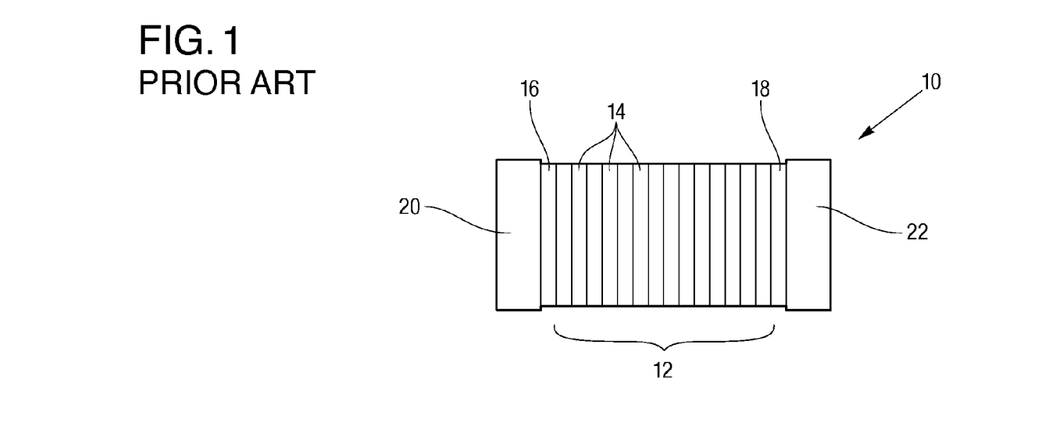
FIG. 1 is a simplified schematic representation of a prior art fuel cell stack.

During operation of such fuel cell stacks 10, creation of heat by the stack 10, and flow of compressed fluids through the stack 10 results in expansion and contraction of dimensions of the stack 10 within operating dynamic limits of the fuel cell stack 10. Therefore, to permit expansion of the stack 10 within such limits, known fuel cell stacks 10 utilize a system to maintain load follow-up. Load follow-up is the distance at which a pressure plate continues loading while the fuel cell stack creeps. In a design with no load follow-up, for example, if an initial load was 60 pounds per square inch ("PSI"), and the stack were to creep, the load would fall off or lessen. For example, if the fuel cell stack creeped 0.050 inches the load would be 50 PSI. A load follow-up distance is the distance the stack can creep while the load remains about constant. ("About constant" is to mean that a slope of load decrease as a function of stack creep is greatly reduced).

A common load follow-up system includes one or more belleville washers (not shown) secured to each tie rod of the stack 10, between a tie rod securing nut (not shown) and the pressure plates 20, 22. Such a load follow-up system provides for limited expansion within the operating dynamic limits of the stack 10 while applying a constant minimum load to the stack 10. Traditionally, to achieve an effective load follow-up system, known fuel cell stacks 10 have utilized large, heavy, metallic pressure plates 20, 22 as part of the load follow-up system.

Such known fuel cell stacks 10 have given rise to many problems related to a high thermal capacity of the large pressure plates 20, 22. For example, during a "bootstrap" start up from subfreezing conditions, preferably no auxiliary heated fluids are applied to the fuel cell stack 10, while a reducing fluid, such as hydrogen, and an oxidant, such as oxygen or air, are supplied to the fuel cells 14. In a fuel cell 14 utilizing a proton exchange membrane ("PEM") as the electrolyte, the hydrogen electrochemically reacts at a catalyst surface of an anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy. Electricity produced by the fuel cells 14 flows into and/or through the conductive pressure plates 20, 22.

During such a "bootstrap" start up, the fuel cells 14 that are in a central region of the stack 10 quickly rise in temperature compared to the end cells 16, 18 that are adjacent opposed ends of the stack 10. The end cells 16, 18 heat up more slowly because heat generated by the end cells 16, 18 is rapidly conducted into the large, conductive metallic pressure plates 20, 22. If a temperature of the end cells 16, 18 is not quickly raised to greater than 0 degrees Celsius ("C"), water in water transport plates within the stack 10 will remain frozen thereby preventing removal of product water, which results in the end cells 16, 18 being flooded with fuel cell product water. The flooding of the end cells 16, 18 retards reactant fluids from reaching catalysts of the end cells 16, 18 and may result in a negative voltage in the end cells 16, 18. The negative voltage in the end cells 16, 18 may result in hydrogen gas evolution at cathode electrodes and/or corrosion of carbon support layers of electrodes of the cells 16, 18. Such occurrences would degrade the performance and long-term stability of the fuel cell stack 10.

Many efforts have been undertaken to resolve such problems. For example, U.S. Pat. No. 6,764,786 that issued on Jul. 20, 2004, to Morrow et al. discloses a pressure plate that is made of an electrically non-conductive, non-metallic, fiber reinforced composite material, so that the pressure plate is light, compact and has a low thermal capacity. Similarly U.S. Pat. No. 6,824,901 that issued on Nov. 30, 2004, to Raiser at al. discloses a fuel cell stack having thermal insulating spacers between pressure plates and end cells. More recently, U.S. Pat. No. 8,354,197 issued on Jan. 15, 2013 to Lake et al. and discloses an integrated end plate assembly using a current collector and an electrically non-conductive pressure plate. A backbone nests within a central backbone support plane and peripheral deflection planes, and the "dog bone" shaped backbone includes tie-rod ends with throughbores that permit deflection of the tie-rod ends within the deflection planes to permit limited expansion and contraction of the fuel cell stack while maintaining a predetermined load follow-up. Unfortunately, while this design provides limited expansion and contraction of the fuel cells of the stack, to achieve an even application of the load follow-up, the pressure plate must be quite thick to achieve a necessary rigidity to apply an even application of the load to the fuel cells. This substantially limits the efficiency of the Lake et al. design.

All of these Patents are owned by the assignee of all rights in the present disclosure. While known fuel cell stacks have limited such problems related to the high thermal capacity of large, metallic pressure plates, such fuel cell stacks still present substantial challenges for efficient operation, especially for PEN electrolyte based fuel cells within fuel cell stacks that undergo frequent start-stop cycles in varying ambient conditions, such as in powering transportation vehicles.

Accordingly, there is a need for a fuel cell stack having end cells wherein temperatures of the end cells can be raised to greater than 0° C. as quickly as possible during start up from subfreezing conditions, and that can also provide an efficient load follow-up system.

SUMMARY

The disclosure is a fuel cell stack having an end plate assembly with a tapered spring plate. The end plate assembly includes a pressure plate secured adjacent a current collector, and the pressure plate defines a spring plate support area that is co-extensive with a central portion of a plane defined by an upper surface of the pressure plate. The tapered spring plate includes a mid-section dimensioned to overlie between about eighty percent and about one-hundred percent of the central portion of the plane defined by the upper surface of the pressure plate. Tie rod extensions of the spring plate extend from the mid-section to overlie deflection cavities defined in the upper surface of the pressure plate. The spring plate defines minimum thicknesses adjacent throughbores in the tie-rod extensions and the mid-section of the spring plate defines a maximum thickness of the spring plate. The thickness of the plate tapers evenly in a non-stepped manner from the thick mid-section to the thin tie-rod extensions at throughbores overlying the deflection cavities. This provides for significant deflection of the tie-rod ends during expansion and contraction of the fuel cells during long-term operation. In response to the deflections, the tie-rod extensions apply a uniform follow-up load through the thick mid-section of the spring plate to between 80% and 100% of the central portion of the pressure plate to thereby apply a nearly uniform or planar load follow-up through planes defined by the fuel cells in the stack. This in turn enables use of a pressure plate and spring plate that are thinner and that apply a more uniform load follow-up than any known prior art end plate assemblies.

In particular, the disclosure includes a fuel cell stack for producing electricity from reducing fluid and process oxidant reactant streams. The fuel cell stack includes a plurality of fuel cells stacked adjacent each other to form a reaction portion of the fuel cell stack, and the plurality of fuel cells also include an end cell at an outer end of the reaction portion of the fuel cell stack. The end plate assembly is secured adjacent the end cell, and the assembly includes a current collector secured adjacent and in electrical communication with the end cell. The end plate assembly also includes the electrically non-conductive pressure plate secured adjacent the current collector and overlying the end cell. The pressure plate defines a current collector contact surface secured adjacent the current collector and also defines an opposed upper surface of the pressure plate. The upper surface includes the spring plate support area defined between at least three deflection cavities within the upper surface. The spring plate support area is co-extensive with the central portion of the plane defined by the upper surface of the pressure plate. The central portion of the plane defined by the upper surface of the pressure plate includes between about forty percent and about seventy percent of the planar area defined by the upper surface of the pressure plate. The deflection cavities are defined between a perimeter of the pressure plate and the spring plate support area of the pressure plate.

The tapered spring plate includes at least three tie-rod extensions defining throughbores that are configured to receive and secure tie rod nut assemblies adjacent the deflection cavities at the perimeter of the pressure plate. The at least three tie-rod extensions extend away from the mid-section of the tapered spring plate, and the tie-rod extensions taper in thickness so that a thinnest portion of each tie-rod extension is adjacent the throughbores and so that a thickest portion of each tie-rod extension is adjacent the mid-section of the tapered spring plate.

The tapered spring plate is configured so that the mid-section of the spring plate overlies between about eighty percent and about one-hundred percent of the central portion of the plane defined by the upper surface of the pressure plate. The tapered spring plate is also configured so that the mid-section of the spring plate contacts the spring plate support area. Additionally, each of the at least three tie-rod extensions of the spring plate extend over one of the deflection cavities to define a gap between the tie-rod extension and the deflection cavity. The tapered spring plate is also configured to have a predetermined flexural strength to thereby apply a predetermined load through the tie rod nut assemblies to the fuel cell stack. The spring plate is also configured to have an adequate flexibility through the tie-rod extensions to permit expansion and contraction of the fuel cell stack within operating dynamic limits of the stack while maintaining the predetermined load on the fuel cell stack. The gap between the deflection cavities and the tie-rod extensions is defined to permit adequate flexure of the tie-rod extensions within the gap to permit expansion and contraction of the fuel cell stack within operating dynamic limits of the stack while maintaining application of the predetermined load by the tapered spring plate through the tie rod nut assemblies to the fuel cell stack.

In one aspect of the disclosure of the fuel cell stack, a thickness of the mid-section of the tapered spring plate includes a maximum thickness of the spring plate and thicknesses of each of the at least three tie-rod extensions adjacent the throughbores include a minimum thickness of the spring plate. The minimum thickness of the spring plate is between about thirty percent and about seventy percent of the maximum thickness of the spring plate. In a further aspect of the fuel cell stack, the minimum thickness of the spring plate is between about fifty percent and about sixty percent of the maximum thickness of the spring plate. Additionally, thicknesses of the spring plate taper evenly in a non-stepped manner between the spring plate areas of maximum thickness and minimum thickness.

In another embodiment of the fuel cell stack, at least two alignment studs are secured to the spring plate support area of the pressure plate and extend from the support surface in a direction away from the current collector contact surface. Additionally, at least one alignment slot is defined within the tapered spring plate and is dimensioned to receive one of a first alignment stud and a first and second alignment stud of the pressure plate. The alignment slot and alignment studs are configured to secure the spring plate in a fixed alignment adjacent the spring plate support area of the pressure plate, so that the spring plate cannot rotate relative to the pressure plate.

In a further embodiment of the fuel cell stack, an extension guide is secured adjacent each of the at least three deflection cavities. Each extension guide extends away from the upper surface of the pressure plate in a direction away from the current collector contact surface. The extension guides and tie-rod extensions are cooperatively configured so that the tie-rod extensions contact the extension guides to prohibit movement of the tapered spring plate in a direction parallel to the plane defined by the upper surface of the pressure plate.

Another aspect of the fuel cell stack is that a minimum planar cross sectional area of the tapered spring plate in a plane parallel to the plane defined by the upper surface of the pressure plate is greater than about sixty-five percent of an area of a plane that is coextensive with and parallel to the upper surface of the pressure plate.

The present disclosure also includes a method of dynamically securing the fuel cells within a fuel cell stack. The method includes defining the spring plate support area of the upper surface of the pressure plate between the at least three deflection cavities so that the spring plate support area is co-extensive with the central portion of the plane defined by the upper surface of the pressure plate wherein the central portion of the plane defined by the upper surface of the pressure plate includes between about forty percent and about seventy percent of a central area of the plane defined by the upper surface of the pressure plate. The method also includes securing the current collector surface of the pressure plate adjacent the current collector; securing the current collector adjacent the end cell of the fuel cell stack; securing tie rod nut assemblies through the throughbores of the tie rod extensions of the tapered spring plate so that the mid-section of the spring plate contacts the spring plate support area of the upper surface of the pressure plate and so that spring plate overlies an area of the pressure plate that is at least about sixty-five percent of an area of a plane that is coextensive with and parallel to the upper surface of the pressure plate.

The method additionally includes deflecting the tie-rod extensions of the tapered spring plate within the gap defined between the deflection cavities of the pressure plate and the tie rod extensions of the tapered spring plate by tightening the tie rod nut assemblies to apply a predetermined load to the fuel cell stack to thereby permit expansion and contraction of the fuel cell stack within operating dynamic limits of the stack while maintaining application of the predetermined load by the tapered spring plate and through the tie rod nut assemblies to the fuel cell stack.

The method may also include the further steps of adjusting the tightening of the tie rod nut assemblies at predetermined intervals to gradually decrease deflection of the tie rod extensions within the gap in response to thinning of the fuel cells resulting from compressive creep, to thereby maintain the predetermined load on the fuel cells in the fuel cell stack during operation of the fuel cells. For purposes herein, the word "about" is to mean plus or minus ten percent.

Accordingly, it is a general purpose of the present disclosure to provide a fuel cell stack having an end plate assembly with a tapered spring plate that overcomes deficiencies of the prior art.

It is a more specific purpose to provide a fuel cell stack having an end plate assembly with a tapered spring plate that applies a load evenly through the cell stack while having a thin pressure plate and spring plate, and that provides an efficient follow-up load system to afford limited expansion and contraction of cells in the stack during operation of the cell stack.

These and other purposes and advantages of the present a fuel cell stack having an end plate assembly with a tapered spring plate will become more readily apparent when the following description is read in conjunction with the accompanying drawings.

DESCRIPTION OF THE PREFERRED EMBODIMENTS

Figure 2:
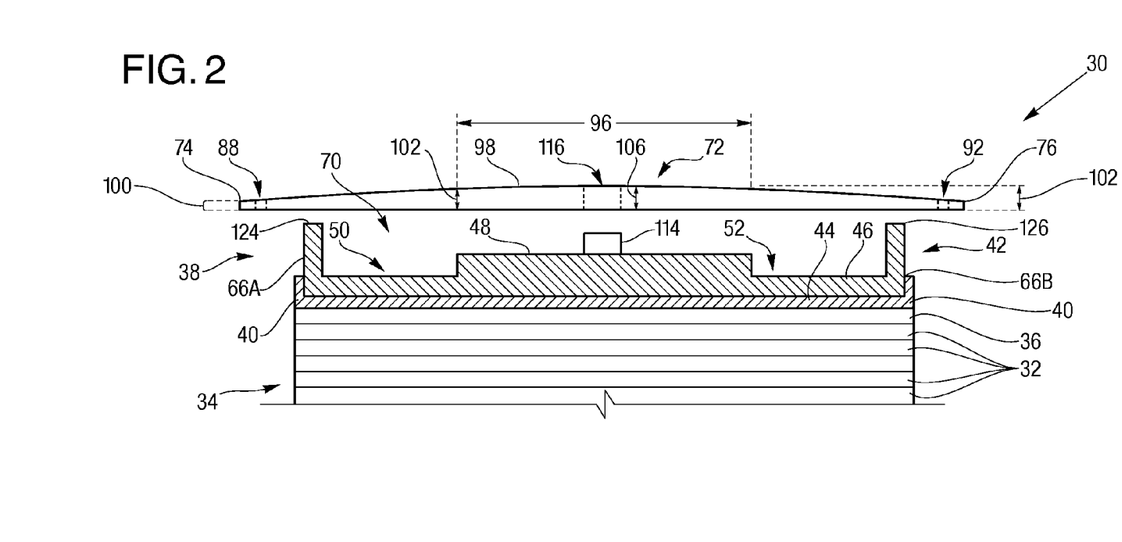
FIG. 2 is a sectional, schematic side view of a fuel cell stack having an end plate assembly with a tapered spring plate constructed in accordance with the present disclosure and showing the tapered spring plate displaced above a pressure plate of the end plate assembly.

Referring to the drawings in detail, a sectional view of a fuel cell stack having an end plate with a tapered spring plate is shown in FIG. 2, and is generally designated by the reference numeral 30. The fuel cell stack 30 includes a plurality of fuel cells 32 stacked adjacent each other to form a reaction portion 34 of the fuel cell stack 30 for producing electricity from reducing fluid and process oxidant reactant streams. An end cell 36 is secured at an outer end of the reaction portion 34 of the fuel cell stack 30. The fuel cell stack 30 also includes the end plate assembly 38 secured adjacent the end cell 36.

Figure 4:
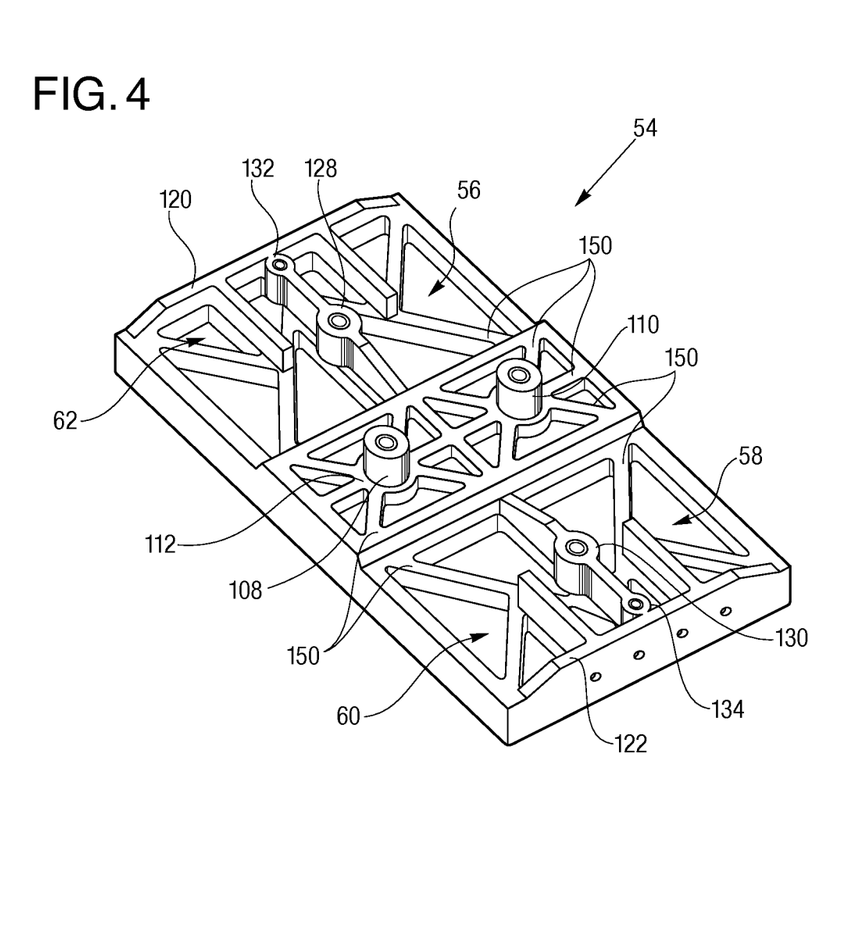
FIG. 4 is a perspective view of a pressure plate of the present fuel cell stack having an end plate assembly with a tapered spring plate.

The end plate assembly 38 includes an electrically conductive current collector 40 secured adjacent to and in electrical communication with the end cell 36 to direct flow of the electrical current from the fuel cells 32, 36 out of the stack 30. The end plate assembly 38 also includes an electrically non-conductive pressure plate 42 secured adjacent the current collector 40 and overlying the end cell 36. The pressure plate 42 defines a current collector contact surface 44 secured adjacent the current collector 40. The pressure plate 42 also defines an opposed upper surface 46 of the pressure plate. The upper surface 46 includes a spring plate support area 48 that is defined between at least three deflection cavities 50, 52 that are defined within the upper surface 46. FIG. 2 shows only two deflection cavities 50, 52 at a front edge the sectional FIG. 2 view of the pressure plate 42. However, FIG. 4 shows a perspective view of a rectangular shaped pressure plate 54 having four deflection cavities 56, 58, 60 and 62 at four opposed corners of the FIG. 4 pressure plate 54. (It is to be understood that the phrase "at least three deflection cavities" is meant to be sufficiently broad to include any fuel cell stacks that are of a cylindrical shape (not shown), a rectangular shape, etc.)

Figure 3:
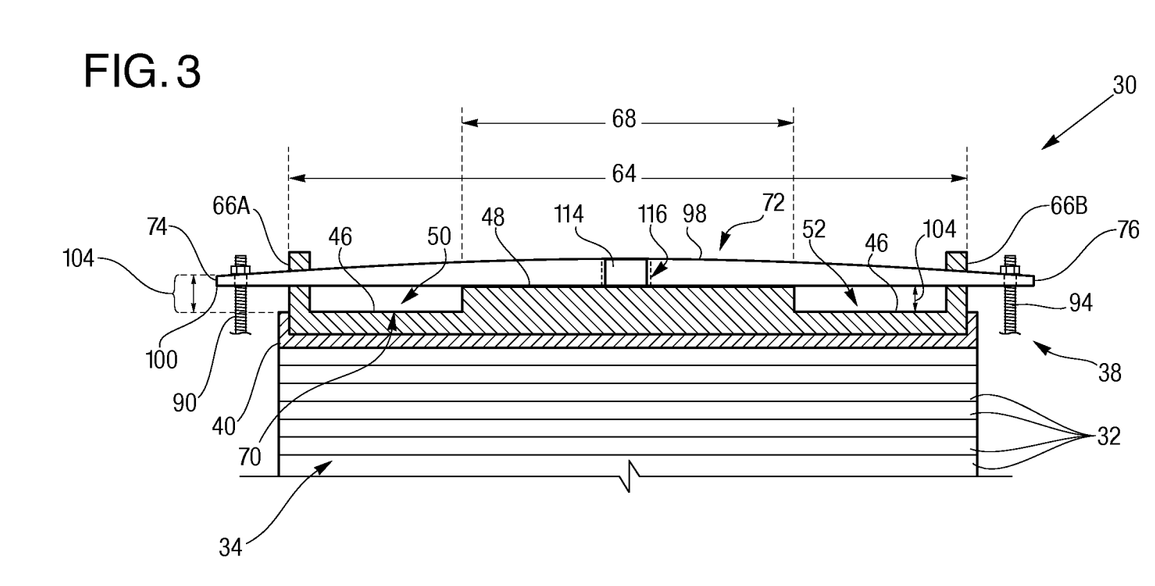
FIG. 3 is a sectional, schematic side view of the FIG. 2 fuel cell stack having an end plate assembly with a tapered spring plate showing the tapered spring plate secured by tie rod nut assemblies to the pressure plate of the end plate assembly.

As shown best in FIG. 3, the upper surface 46 of the pressure plate 42 defines a plane 64 parallel to the upper surface 46 of the pressure plate 42. The plane 46 defined by the upper surface 46 is also co-extensive with the upper surface 46 extending between perimeter edges 66A, 66B of the upper surface 46 of the pressure plate 42. Within the upper surface 46, the spring plate support area 48 is co-extensive with a central portion 68 of the plane 64 defined by the upper surface of the pressure plate 42. The central portion 68 of the plane 64 defined by the upper surface of the pressure plate 42 includes between about forty percent and about seventy percent of a planar area 70 defined by the upper surface 46 of the pressure plate 42. As seen in FIGS. 2 and 3, the deflection cavities 50, 52, are defined between the perimeter edges 66A, 66B of the pressure plate 42 and the spring plate support area 48 of the pressure plate 42.

Figure 5:
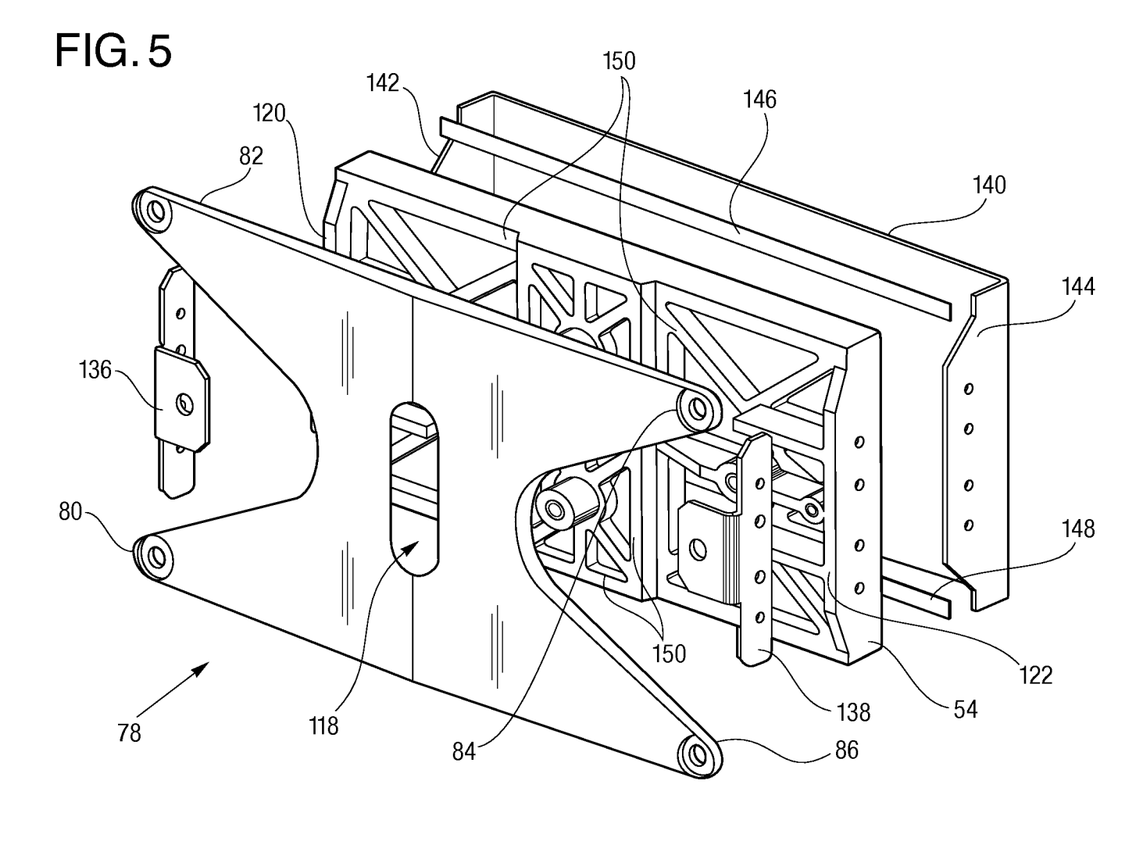
FIG. 5 is a raised perspective view of the present end plate assembly showing a tapered spring plate displaced in front of a pressure plate, and showing a current collector displaced behind the pressure plate.
Figure 6:
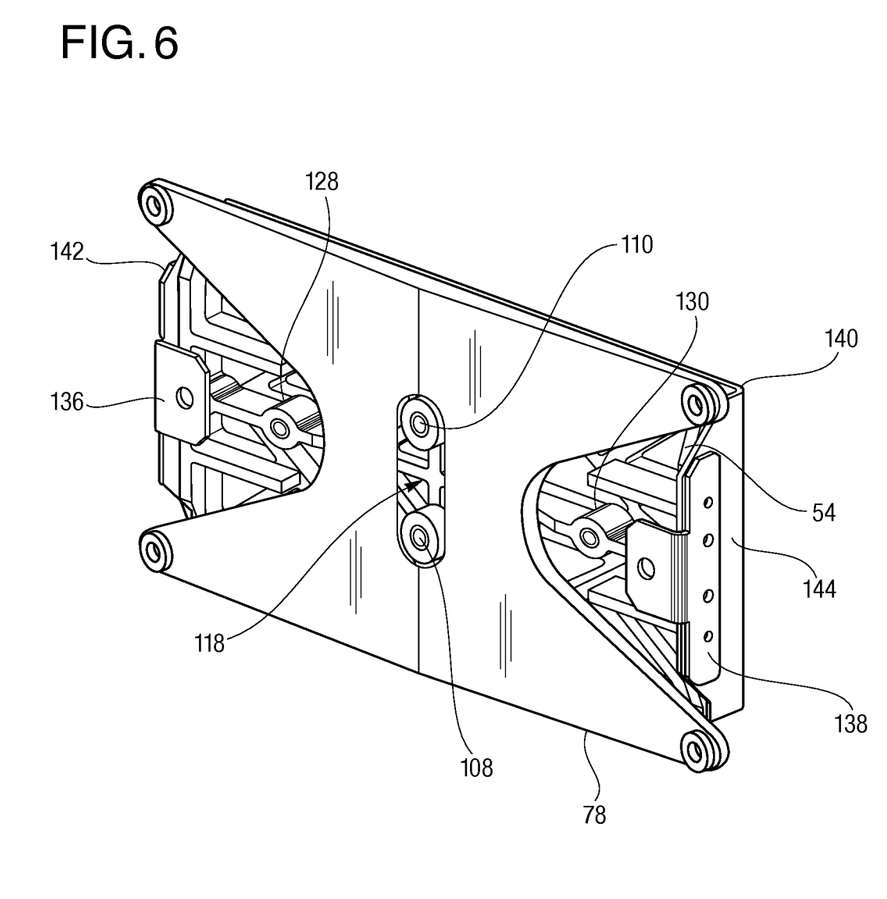
FIG. 6 is a raised perspective view of the FIG. 5 end plate assembly, showing the tapered spring plate, pressure plate and current collector secured to each other as an assembled end plate assembly.

It is pointed out that the "central portion 68" of the plane 64 of the upper surface 46 of the pressure plate 42 is being defined as a proportionate area compared to the "planar area 70 defined by the upper surface 46 of the pressure plate 42" because the physical upper surface 46 is not necessarily planar. As shown in FIGS. 4-6, most often the upper surface 46 of the pressure plate consists of structural ribs and raised edges for purposes of maximizing a load bearing strength while minimizing thicknesses and amounts of material utilized in making the pressure plate 42. In particular, the "central portion 68" of the plane 64 of the upper surface area includes between about forty percent and about seventy percent of a planar area 70 of the upper surface 46 wherein the central portion 68 is about equidistant from the perimeter edges 66A, 66B of the upper surface 46 of the pressure plate 42.

As shown in FIGS. 2 and 3, the end plate assembly 38 also includes a tapered spring plate 72 having at least three tie-rod extensions 74, 76. FIGS. 2 and 3 show only two tie-rod extensions 74, 76. However, another or second tapered spring plate 78 shown in FIGS. 5 and 6 includes four tie-rod extensions 80, 82, 84 and 86. In the FIGS. 2 and 3 tapered spring plate, the first tie-rod extension 74 defines a first throughbores 88 for receiving and securing a first tie rod nut assembly 90 (shown only in FIG. 3) and the second tie-rod extension 76 defines a second throughbore 92 for receiving and securing a second tie rod nut assembly 94. As shown in FIG. 3, the tie rod nut assemblies 90, 94 are configured to be adjacent the deflection cavities 50, 52 at the perimeter edges 66A, 66B of the pressure plate 42.

As shown in FIGS. 2 and 3, the tie-rod extensions 74, 76 extend away from a mid-section 96 of the tapered spring plate 72. The mid-section 96 is defined to include between about forty percent and about seventy percent of an area of a top surface 98 of the tapered spring plate 72, wherein the mid-section 96 is about equidistant from the throughbores 88, 92. The tie-rod extensions 74, 76 taper in thickness so that a thinnest portion 100 or minimum thickness 100 of the first tie-rod extension 74 is adjacent the first throughbore 88 and so that a thickest portion 102 of the first tie-rod extension 74 is adjacent the mid-section 96 of the tapered spring plate 72. The same tapering applies to all other tie-rod extensions 76 (in FIGS. 2 and 3) and tie-rod extensions 80, 82, 84, 86 in FIGS. 5 and 6.

The tapered spring plate 72 is configured so that the mid-section 96 of the spring plate 72 overlies between about eighty percent and about one-hundred percent of the central portion 68 of the plane 64 defined by the upper surface 46 of the pressure plate 42. The tapered spring plate 72 is also configured so that the mid-section 96 of the spring plate 72 contacts the spring plate support area 48. Additionally, each of the tie-rod extensions 74, 76 of the spring plate 72 extend over one of the deflection cavities 50, 52 to define a gap 104, as shown in FIG. 3 with respect to the gap 104 between the first tie-rod extension 74 and the first deflection cavity 50.

As summarized above, the tapered spring plate 72 is also configured to have a predetermined flexural strength to thereby apply a predetermined load through the tie rod nut assemblies 90, 94 (as shown in FIG. 3) to the stack of fuel cells 32. The spring plate 72 is also configured to have an adequate flexibility through the tie-rod extensions 74, 76 to permit expansion and contraction of the fuel cell stack 30 within operating dynamic limits of the stack 30 while maintaining the predetermined load on the fuel cell stack 30. The gap 104 between the deflection cavity 50 and the tie-rod extensions 74 is defined to permit adequate flexure of the tie-rod extension 74 within the gap 104 (shown in FIG. 3) to permit expansion and contraction of the fuel cell stack 30 within operating dynamic limits of the stack 30 while maintaining application of the predetermined load by the tapered spring plate 72 through the tie rod nut assembly 90 to the fuel cell stack 30.

In one aspect of the disclosure of the fuel cell stack 30, a thickness of the mid-section 96 of the tapered spring plate 72 includes a maximum thickness 106 of the spring plate 72 and thicknesses of each of the tie-rod extensions 74, 76 adjacent their respective throughbores 88, 92 include a minimum thickness 100 of the spring plate 72. As best shown in FIG. 2, the minimum thickness 100 of the spring plate 72 is between about thirty percent and about seventy percent of the maximum thickness 106 of the spring plate. In a further aspect of the fuel cell stack 30, the minimum thickness 100 of the spring plate is between about fifty percent and about sixty percent of the maximum thickness 106 of the spring plate 72. It is stressed again that thicknesses of the spring plate 72 between the maximum thickness 106 and the minimum thicknesses 100 in the tie-rod extensions 74, 76 taper evenly in a non-stepped manner between the spring plate 72 areas of maximum thickness 106 and minimum thickness 100.

In another embodiment of the fuel cell stack 30 as shown best in FIG. 4, at least two alignment studs 108, 110 are secured to a spring plate support area 112 of the FIG. 4 pressure plate 54. As shown in FIGS. 2 and 3, only one alignment stud 114 is shown and it extends from the spring plate support area 48 in a direction away from the current collector contact surface 44 of the FIGS. 2 and 3 pressure plate 42. Additionally, at least one alignment slot (reference numeral 116 in FIGS. 2 and 3, and reference numeral 118 in FIGS. 5 and 6) is defined within the tapered spring plate and, as shown in FIGS. 5 and 6 is dimensioned to receive one of a first alignment stud 108 and a first 108 and second alignment stud 110 of the pressure plate 54. The alignment slot 118 and alignment studs 108, 110 are configured to secure the spring plate 78 (FIGS. 5 and 6) in a fixed alignment adjacent the spring plate support area 112 of the pressure plate 54, so that the tapered spring plate 79 cannot rotate relative to the pressure plate 54.

In a further embodiment of the fuel cell stack 30, extension guides are secured adjacent each of the deflection cavities 50, 52 (FIGS. 2 and 3) 56, 58, 60, 62 (FIGS. 4-6). In the FIGS. 4-6 embodiment of the pressure plate 54, a first extension guide 120 is shown adjacent deflection cavities 56 and 62, and a second extension guide 122 is shown adjacent deflection cavities 58, 60. In the FIGS. 2 and 3 embodiment of the pressure plate 42, a third extension guide 124 is shown adjacent deflection cavity 50, and a fourth extension guide 126 is shown adjacent deflection cavity 52. Each extension guide 124, 126 extends away from the upper surface 46 of the pressure plate 42 in a direction away from the current collector contact surface 44. The extension guides 124, 126 and tie-rod extensions 74, 76 (shown best in FIGS. 2 and 3) are cooperatively configured so that the tie-rod extensions 74, 76 contact the extension guides 124, 126 to prohibit movement of the tapered spring plate 72 in a direction parallel to the plane 64 defined by the upper surface 46 of the pressure plate 42. The extension guides 124, 126 may also be sloped to facilitate guidance of the tapered spring plate 72 into proper and secure location adjacent the spring plate support area 48 of the pressure plate 42 during assembly of the end plate assembly 38.

Another aspect of the present fuel cell stack 30 is that a minimum planar cross sectional area of the tapered spring plate 72 in a plane parallel to the plane 64 defined by the upper surface 46 of the pressure plate 42 is greater than about sixty-five percent of an area of the plane 64 defined by the upper surface 46 of the pressure plate 42, wherein the plane 64 is coextensive with and parallel to the upper surface 46 of the pressure plate 42.

As described above, FIGS. 4-6 show an alternative or second embodiment of the pressure plate 54 and it may also include auxiliary studs 128, 130 that may house fluid transfer ports within the studs 128, 130 for transferring reactant fluids into an out of fuel cell stack 30 manifolds (not shown). FIG. 4 also shows a first bus-bar mounting stud 132 adjacent the first extension guide 120 and a second bus-bar mounting stud 134 adjacent the second extension guide 122. The bus-bar mounting studs 132, 134 aid in securing a first bus bar 136 and a second bus bar 138 (shown in FIGS. 5 and 6) to a FIGS. 5 and 6 second current collector 140 and to the second or FIGS. 5 and 6 pressure plate 54. The second current collector 140 includes a first bent edge 142 and a second bent edge 144 configured to contact and be secured to the first extension guide 120 and second extension guide 122 of the second pressure plate 54. The first and second bus bars 136, 138 are secured to the first and second bent edges 142, 144 respectively, as shown in the sequential FIGS. 5 and 6 to provide connection points for connecting the conductive current collector 140 to wires or other electricity conductors (not shown). The second current collector 140 shown in FIGS. 5 and 6 may also include a first gasket 146 and a second gasket 148 secured between side edges of the current collector 140 and the pressure plate 54 to prohibit movement of any reactant fluids through the gaskets 146, 148 between the current collector 140 and the pressure plate 54. FIGS. 4 and 5 also show a plurality of structural ribs 150 having upper surfaces that define the spring plate support area 112 of the second pressure plate 54. As described above, the spring plate support area 112 may be formed of any combination of structural ribs 150 or raised surface areas 48 that serve to support the mid-section 96 of the tapered spring plate 72 (shown in FIGS. 2 and 3) so that the tie-rod extensions 74, 76 extend over the deflection cavities 50, 52 defined adjacent the spring plate support area 48 to define a gap, such as the gap 104, between the tie-rod extensions 74, 76 and the deflection cavities 50, 52.

Because the pressure plates 42, 54 are electrically non-conductive, they may be made by injection molding processes utilized in manufacture of plastic apparatus. The tapered spring plate 72 is preferably made of a metal compound, and in particular a Castable Stainless or Carbon Steel is preferred. Exact material choices and thicknesses are driven by the flexural properties desired. One specific embodiment contains UNS17400 per ASTM A693 Grade 630 that was precipitation hardened to Rockwell C40-C48.

The present disclosure also includes a method of dynamically securing the fuel cells 32 within a fuel cell stack 30. The method includes defining the FIGS. 2 and 3 spring plate support area 48 of the upper surface 46 of the pressure plate 42 between the deflection cavities 50, 52 so that the spring plate support area 48 is co-extensive with the central portion 68 of the plane 64 defined by the upper surface 46 of the pressure plate 42 wherein the central portion 68 of the plane 64 defined by the upper surface 46 of the pressure plate 42 includes between about forty percent and about seventy percent of the planar area 70 defined by the upper surface 46 of the pressure plate 42. The method also includes securing the current collector contact surface 44 of the pressure plate 42 adjacent the current collector 42; securing the current collector 42 adjacent the end cell 36 of the fuel cell stack 30; securing tie rod nut assemblies 90, 94 through the through-bores 88, 92 of the tie rod extensions 74, 76 of the tapered spring plate 72 so that the mid-section 96 of the spring plate 72 contacts the spring plate support area 48 of the upper surface 46 of the pressure plate 42 and so that spring plate 72 overlies an area that is at least about sixty-five percent of the planar area 70 defined by the upper surface 46 of the pressure plate 42.

The method additionally includes deflecting the tie-rod extensions 74, 76 of the tapered spring plate 72 within the gaps 104 defined between the deflection cavities 50, 52 of the pressure plate 42 and the tie rod extensions 74, 76 of the tapered spring plate 72 by tightening the tie rod nut assemblies 90, 94 to apply a predetermined load to the fuel cell stack 30 to thereby permit expansion and contraction of the fuel cell stack 30 within operating dynamic limits of the stack 30 while maintaining application of the predetermined load by the tapered spring plate 72 through the tie rod nut assemblies 90, 94 to the fuel cell stack 30.

The method may also include the further steps of adjusting the tightening of the tie rod nut assemblies 90, 94 at predetermined intervals to gradually change deflection of the tie rod extensions 74, 76 within the gap 104 in response to thinning of the fuel cells 32 resulting from compressive creep or lateral expansion of compressible components of the fuel cell stack 30, such as the gaskets 146, 144, etc., to thereby maintain the predetermined load on the fuel cells in the fuel cell stack during operation of the fuel cells.

In an exemplary fuel cell stack using the described end plate assembly with a tapered spring plate, the fuel cell stack maintained a load follow-up distance of between about 6.5 millimeters ("am") and 7.0 mm. In contrast, the load follow-up distance of the end plate assembly described in the above referenced and commonly owned U.S. Pat. No. 8,354,197 to Lake et al. on a similar sized fuel cell stack is about 3.0 mm. Additionally, the present end plate assembly with a tapered spring plate provides a thinner end plate assembly than that disclosed in the aforesaid Lake et al. patent. The load-applying "backbone" of the Lake et al. patent and known "spring-loaded" pressure plates simply utilize arms that extend to tie-rod nut assemblies at corners or edges of the fuel cell stack. The arms are simple cantilevered beams that deflect along an axis that is perpendicular to a longitudinal beam of the arm. In contrast, because the present tapered spring plate 72 is tapered and also because the spring plate 72 covers so much of the planar area of the spring plate support area 48 of the upper surface 46 of the pressure plate 42, the present tapered spring plate 72 deflects in a much more complex shape and therefore distributes the follow-up load more evenly through the pressure plate 42, while being capable of tolerating greater loads than non-tapered springs and known end plate assemblies, and again, while being thinner than known end plate assemblies that provide comparable load follow-up distances.

For purposes herein, the word "about" is to mean plus or minus ten percent.

While the present disclosure has been disclosed with respect to the described and illustrated fuel cell stack 30 having an end plate assembly 38 with a tapered spring plate 72, it is to be understood the disclosure is not to be limited to those alternatives and described embodiments. For example, the disclosure may be utilized with any fuel cells including phosphoric acid fuel cells, proton exchange membrane fuel cells, etc. Accordingly, reference should be made primarily to the following claims rather than the forgoing description to determine the scope of the disclosure.

What is claimed is:

1. A fuel cell stack for producing electricity from reducing fluid and process oxidant reactant streams, the fuel cell stack comprising:
   a plurality of fuel cells stacked adjacent each other to form a reaction portion of the fuel cell stack, the plurality of fuel cells including an end cell at an outer end of the reaction portion of the fuel cell stack;
   an end plate assembly secured adjacent the end cell, the assembly including:
      a current collector secured adjacent and in electrical communication with the end cell;
      an electrically non-conductive pressure plate secured adjacent the current collector and overlying the end cell, the pressure plate defining a current collector contact surface secured adjacent the current collector and an opposed upper surface, the upper surface including a spring plate support area defined between at least three deflection cavities within the upper surface, the spring plate support area being co-extensive with a central portion of a plane defined by the upper surface of the pressure plate wherein the central portion of the plane defined by the upper surface of the pressure plate includes between about forty percent and about seventy percent of the planar area defined by the upper surface of the pressure plate, the deflection cavities being defined between perimeter edges of the pressure plate and the spring plate support area of the pressure plate;
      a tapered spring plate including at least three tie-rod extensions defining throughbores having a size and a shape to receive and secure tie rod nut assemblies adjacent the deflection cavities at the perimeter edges of the pressure plate, the at least three tie-rod extensions extending away from a mid-section of the tapered spring plate, and the at least three tie-rod extensions tapering in thickness so that a thinnest portion of each tie-rod extension is adjacent the throughbores and so that a thickest portion of each tie-rod extension is adjacent the mid-section of the tapered spring plate, the tapered spring plate configured so that the mid-section of the spring plate overlies between about eighty percent and about one-hundred percent of the central portion of the plane defined by the upper surface of the pressure plate, and the tapered spring plate also configured so that the mid-section of the spring plate contacts the spring plate support area and each of the at least three tie-rod extensions extend over one of the deflection cavities to define a gap between the tie-rod extension and the deflection cavity;
   the tapered spring plate having a flexural strength to apply a load through the tie rod nut assemblies to the fuel cell stack and the spring plate also being flexible to permit expansion and contraction of the fuel cell stack during operation of the stack while maintaining the load on the fuel cell stack; and
   the gap between the deflection cavities and the tie-rod extensions being defined to permit flexure of the tie-rod extensions within the gap in response to expansion and contraction of the fuel cell stack during operation while maintaining application of the load by the tapered spring plate through the tie rod nut assemblies to the fuel cell stack,
   wherein a thickness of the mid-section of the tapered spring plate includes a maximum thickness of the spring plate and thicknesses of each of the at least three tie-rod extensions adjacent the throughbores include a minimum thickness of the spring plate, and wherein the minimum thickness of the spring plate is between about thirty percent and about seventy percent of the maximum thickness of the spring plate, and wherein thicknesses of the spring plate taper evenly in a non-stepped manner between the spring plate areas of maximum thickness and minimum thickness.

2. A fuel cell stack for producing electricity from reducing fluid and process oxidant reactant streams, the fuel cell stack comprising:
   a plurality of fuel cells stacked adjacent each other to form a reaction portion of the fuel cell stack, the plurality of fuel cells including an end cell at an outer end of the reaction portion of the fuel cell stack;
   an end plate assembly secured adjacent the end cell, the assembly including:
      a current collector secured adjacent and in electrical communication with the end cell;
      an electrically non-conductive pressure plate secured adjacent the current collector and overlying the end cell, the pressure plate defining a current collector contact surface secured adjacent the current collector and an opposed upper surface, the upper surface including a spring plate support area defined between at least three deflection cavities within the upper surface, the spring plate support area being co-extensive with a central portion of a plane defined by the upper surface of the pressure plate wherein the central portion of the plane defined by the upper surface of the pressure plate includes between about forty percent and about seventy percent of the planar area defined by the upper surface of the pressure plate, the deflection cavities being defined between perimeter edges of the pressure plate and the spring plate support area of the pressure plate;
      a tapered spring plate including at least three tie-rod extensions defining throughbores having a size and a shape to receive and secure tie rod nut assemblies adjacent the deflection cavities at the perimeter edges of the pressure plate, the at least three tie-rod extensions extending away from a mid-section of the tapered spring plate, and the at least three tie-rod extensions tapering in thickness so that a thinnest portion of each tie-rod extension is adjacent the throughbores and so that a thickest portion of each tie-rod extension is adjacent the mid-section of the tapered spring plate, the tapered spring plate configured so that the mid-section of the spring plate overlies between about eighty percent and about one-hundred percent of the central portion of the plane defined by the upper surface of the pressure plate, and the tapered spring plate also configured so that the mid-section of the spring plate contacts the spring plate support area and each of the at least three tie-rod extensions extend over one of the deflection cavities to define a gap between the tie-rod extension and the deflection cavity;

the tapered spring plate having a flexural strength to apply a load through the tie rod nut assemblies to the fuel cell stack and the spring plate also being flexible to permit expansion and contraction of the fuel cell stack during operation of the stack while maintaining the load on the fuel cell stack; and the gap between the deflection cavities and the tie-rod extensions being defined to permit flexure of the tie-rod extensions within the gap in response to expansion and contraction of the fuel cell stack during operation while maintaining application of the load by the tapered spring plate through the tie rod nut assemblies to the fuel cell stack, wherein a thickness of the mid-section of the tapered spring plate includes a maximum thickness of the spring plate and thicknesses of each of the at least three tie-rod extensions adjacent the throughbores include a minimum thickness of the spring plate, and wherein the minimum thickness of the spring plate is between about fifty percent and about sixty percent of the maximum thickness of the spring plate, and wherein thicknesses of the spring plate taper evenly in a non-stepped manner between the spring plate areas of maximum thickness and minimum thickness.

3. A fuel cell stack for producing electricity from reducing fluid and process oxidant reactant streams, the fuel cell stack comprising:

a plurality of fuel cells stacked adjacent each other to form a reaction portion of the fuel cell stack, the plurality of fuel cells including an end cell at an outer end of the reaction portion of the fuel cell stack;

an end plate assembly secured adjacent the end cell, the assembly including:

a current collector secured adjacent and in electrical communication with the end cell;

an electrically non-conductive pressure plate secured adjacent the current collector and overlying the end cell, the pressure plate defining a current collector contact surface secured adjacent the current collector and an opposed upper surface, the upper surface including a spring plate support area defined between at least three deflection cavities within the upper surface, the spring plate support area being coextensive with a central portion of a plane defined by the upper surface of the pressure plate wherein the central portion of the plane defined by the upper surface of the pressure plate includes between about forty percent and about seventy percent of the planar area defined by the upper surface of the pressure plate, the deflection cavities being defined between perimeter edges of the pressure plate and the spring plate support area of the pressure plate;

a tapered spring plate including at least three tie-rod extensions defining throughbores having a size and a shape to receive and secure tie rod nut assemblies adjacent the deflection cavities at the perimeter edges of the pressure plate, the at least three tie-rod extensions extending away from a mid-section of the tapered spring plate, and the at least three tie-rod extensions tapering in thickness so that a thinnest portion of each tie-rod extension is adjacent the throughbores and so that a thickest portion of each tie-rod extension is adjacent the mid-section of the tapered spring plate, the tapered spring plate configured so that the mid-section of the spring plate overlies between about eighty percent and about one-hundred percent of the central portion of the plane defined by the upper surface of the pressure plate, and the tapered spring plate also configured so that the mid-section of the spring plate contacts the spring plate support area and each of the at least three tie-rod extensions extend over one of the deflection cavities to define a gap between the tie-rod extension and the deflection cavity;

the tapered spring plate having a flexural strength to apply a load through the tie rod nut assemblies to the fuel cell stack and the spring plate also being flexible to permit expansion and contraction of the fuel cell stack during operation of the stack while maintaining the load on the fuel cell stack;

the gap between the deflection cavities and the tie-rod extensions being defined to permit flexure of the tie-rod extensions within the gap in response to expansion and contraction of the fuel cell stack during operation while maintaining application of the load by the tapered spring plate through the tie rod nut assemblies to the fuel cell stack; and at least two alignment studs secured to the spring plate support area of the pressure plate and extending from the support area in a direction away from the current collector contact surface, at least one alignment slot defined within the tapered spring plate dimensioned to receive at least one of the at least two alignment studs to secure the spring plate in fixed alignment adjacent the spring plate support area of the pressure plate.

4. The fuel cell stack of claim 1, further comprising an extension guide adjacent each of the at least three deflection cavities, each extension guide extending away from the upper surface of the pressure plate in a direction away from the current collector contact surface, the extension guides and tie-rod extensions being cooperatively configured so that the tie-rod extensions contact the extension guides to prohibit movement of the tapered spring plate in a direction parallel to the plane defined by the upper surface of the pressure plate.

5. The fuel cell stack of claim 1, wherein a minimum planar cross sectional area of the tapered spring plate in a plane parallel to the plane defined by the upper surface of the pressure plate is greater than about sixty-five percent of an area of a plane that is coextensive with and parallel to the upper surface of the pressure plate.

6. A method of dynamically securing fuel cells within a fuel cell stack, comprising:

defining a spring plate support area of an upper surface of a pressure plate between at least three deflection cavities of the pressure plate so that the spring plate support area is co-extensive with a central portion of a plane defined by the upper surface of the pressure plate wherein the central portion of the plane defined by the upper surface of the pressure plate includes between about forty percent and about seventy percent of a planar area of the upper surface of the pressure plate;

securing a current collector surface of the pressure plate adjacent a current collector;

securing the current collector adjacent an end cell of the fuel cell stack;

securing tie rod nut assemblies through throughbores of tie rod extensions of a tapered spring plate so that a mid-section of the spring plate contacts the spring plate support area of the upper surface of the pressure plate and so that the spring plate overlies an area that is at least about sixty-five percent of the planar area defined by the upper surface of the pressure plate;

deflecting the tie-rod extensions of the tapered spring plate within a gap defined between the at least three deflection cavities of the pressure plate and the tie rod extensions of the tapered spring plate by tightening one or more tie rod nut assemblies to apply a load to the fuel cell stack to thereby permit expansion and contraction of the fuel cell stack during operation while maintaining application of the load by the tapered spring plate to the fuel cell stack through the tie rod nut assemblies;

forming at least two alignment studs on the spring plate support area of the pressure plate;

forming at least one alignment slot within the tapered spring plate, the at least one alignment slot dimensioned to receive at least one of the at least two alignment studs; and aligning at least one of the at least two alignment studs in the at least one alignment slot to secure the spring plate in fixed alignment adjacent the spring plate support area of the pressure plate.

7. The method of claim 6, further comprising:

adjusting the tie rod nut assemblies to gradually change deflection of the tie rod extensions within the gap in response to thinning of the fuel cells within the fuel cell stack resulting from compressive creep, to thereby maintain the load on the fuel cells in the fuel cell stack during operation of the fuel cells.

8. The method of claim 6, wherein securing the tie rod nut assemblies includes forming an extension guide on the pressure plate adjacent each of the at least three deflection cavities, the extension guides contacting the tie rod nut assemblies to prohibit lateral translation of the spring plate.

* * * * *